United States Patent
Yamada et al.

(10) Patent No.: US 7,981,564 B2
(45) Date of Patent: Jul. 19, 2011

(54) SOLID ELECTROLYTE FUEL CELL AND OPERATING METHOD THEREOF

(75) Inventors: Takashi Yamada, Ibaraki (JP); Hiroyuki Eto, Ibaraki (JP); Norikazu Komada, Ibaraki (JP)

(73) Assignees: Mitsubishi Materials Corporation, Tokyo (JP); The Kansai Electric Power Co., Ltd., Osaka (JP)

( * ) Notice: Subject to any disclaimer, the term of this patent is extended or adjusted under 35 U.S.C. 154(b) by 373 days.

(21) Appl. No.: 12/160,388

(22) PCT Filed: Jan. 12, 2007

(86) PCT No.: PCT/JP2007/050323
§ 371 (c)(1),
(2), (4) Date: Jul. 9, 2008

(87) PCT Pub. No.: WO2007/080966
PCT Pub. Date: Jul. 19, 2007

(65) Prior Publication Data
US 2010/0227245 A1   Sep. 9, 2010

(30) Foreign Application Priority Data

Jan. 13, 2006 (JP) ................................. 2006-005718

(51) Int. Cl.
*H01M 8/10* (2006.01)
(52) U.S. Cl. ........................ 429/479; 429/428
(58) Field of Classification Search .................. 429/479
See application file for complete search history.

(56) References Cited

U.S. PATENT DOCUMENTS 6,967,065 B1  11/2005 Saitou et al.
2004/0028994 A1 *  2/2004 Akikusa et al. ................. 429/44

FOREIGN PATENT DOCUMENTS

JP  11-162478   6/1999
JP  11-297333   10/1999
(Continued)

OTHER PUBLICATIONS

International Search Report issued Apr. 10, 2007 in the International (PCT) Application No. PCT/JP2007/050323.

*Primary Examiner* — Patrick Ryan
*Assistant Examiner* — Brent Thomas
(74) *Attorney, Agent, or Firm* — Wenderoth, Lind & Ponack, L.L.P.

(57) ABSTRACT

A solid electrolyte fuel cell having a long service life includes a power generating cell having a fuel electrode laminated on one surface of a solid electrolyte and an air electrode laminated on the other surface, an air electrode current collector laminated in contact with the air electrode of the power generating cell and formed of a porous silver material or a silver-coated porous metal material, a fuel electrode current collector laminated in contact with the fuel electrode of the power generating cell, an air electrode-side separator having a silver-plated layer formed on its surface on the side contacting the fuel electrode current collector, a fuel electrode-side separator laminated in contact with the fuel electrode current collector, and air supply passage provided by being connected with the air electrode-side separator and a fuel supply passage provided by being connected with the fuel electrode-side separator, wherein a silver vapor supply unit is provided in the air supply passage to thereby supply silver vapor-containing air to the air electrode current collector.

6 Claims, 2 Drawing Sheets

FOREIGN PATENT DOCUMENTS

| JP | 11-335164 | 12/1999 |
| JP | 2000-164228 | 6/2000 |
| JP | 2000-226681 | 8/2000 |
| JP | 2002-237312 | 8/2002 |
| JP | 2002-280026 | 9/2002 |
| JP | 2002-289215 | 10/2002 |
| JP | 2002-298878 | 10/2002 |
| JP | 2004-139960 | 5/2004 |

* cited by examiner

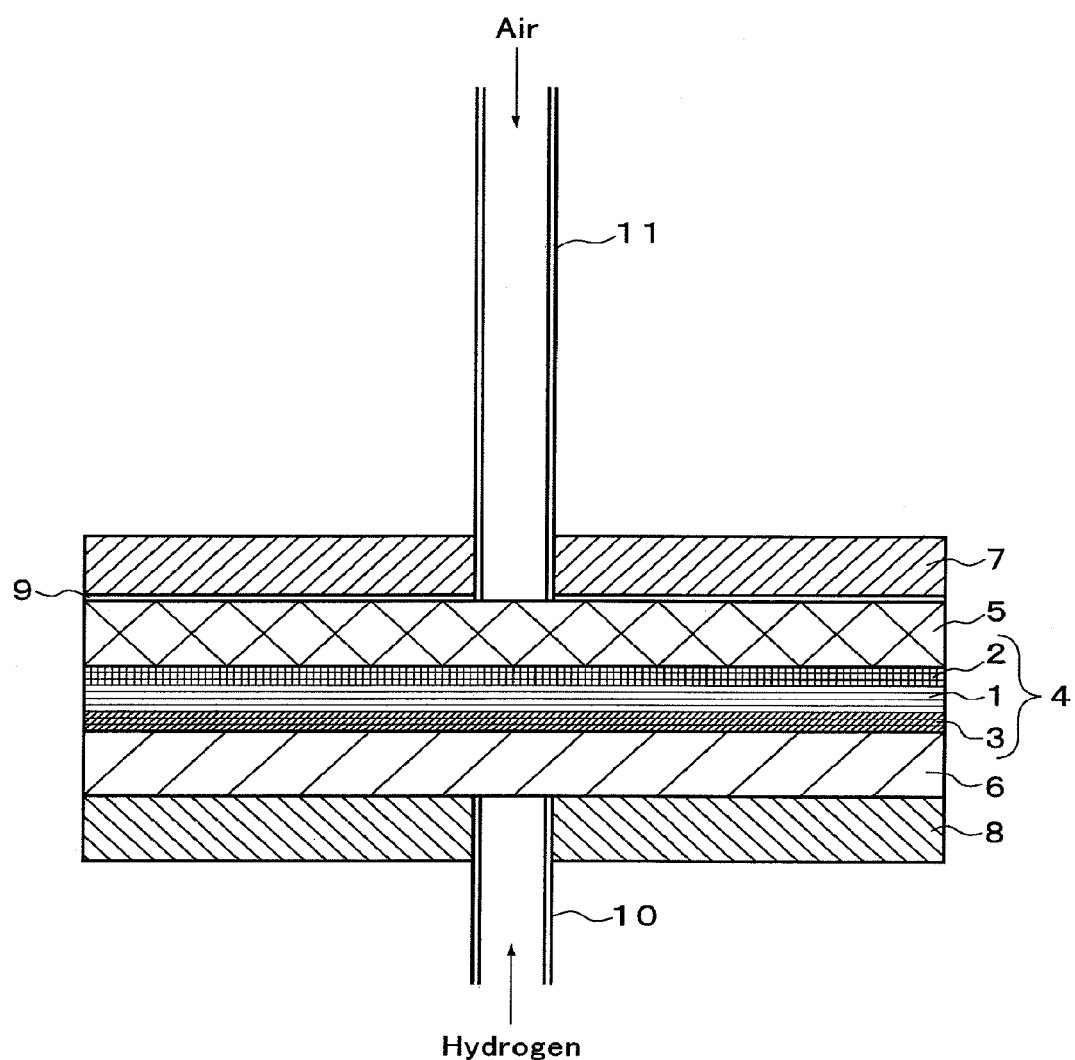

SOLID ELECTROLYTE FUEL CELL AND OPERATING METHOD THEREOF

BACKGROUND OF THE INVENTION

I. Technical Field

The present invention relates to an operating method of a solid electrolyte fuel cell capable of being operated for a long period of time without degrading the performance thereof, and additionally relates to a solid electrolyte fuel cell capable of being used for a long period of time without degrading the performance thereof.

II. Description of the Related Art

In general, solid electrolyte fuel cells can use, as fuel, hydrogen gas, natural gas, methanol, coal gas or the like, accordingly solid electrolyte fuel cells enable promotion of the adoption of an alternative energy to petroleum in electricity generation to utilize the exhaust heat, and hence have been attracting attention also from the viewpoints of natural resources saving and environmental issues. As shown in FIG. 2 illustrating a sectional view, such a conventional solid electrolyte fuel cell generally has a fundamental structure in which: a power generating cell 4 having a solid electrolyte 1 composed of an oxide, an air electrode 2 laminated on one side of the solid electrolyte 1, and a fuel electrode 3 laminated on the other side of the solid electrolyte is provided; an air electrode current collector 5 is laminated on the outer side of the air electrode 2 of the power generating cell 4; a fuel electrode current collector 6 is laminated on the outer side of the fuel electrode 3 of the power generating cell 4; an air electrode current collector-side separator 7 is laminated on the outer side of the air electrode current collector 5; and a fuel electrode current collector-side separator 8 is laminated on the outer side of the fuel electrode current collector 6. The air supplied to the air electrode current collector 5 is supplied through an air supply passage 11 including a pipe provided by being connected to the air electrode current collector-side separator 7, and the hydrogen supplied to the fuel electrode current collector 6 is supplied through a fuel supply passage 10 including a pipe provided by being connected to the fuel electrode current collector-side separator 8.

Lanthanum gallate oxide ion conductors are known to be used as the solid electrolyte 1 forming the power generating cell 4 of the solid electrolyte fuel cell; the lanthanum gallate oxide ion conductors are known to be the oxide ion conductors represented by a general formula, $La_{1-X}Sr_XGa_{1-Y-Z}Mg_YA_ZO_3$ (wherein A is one or more of Co, Fe, Ni and Cu, X=0.05 to 0.3, Y=0 to 0.29, Z=0.01 to 0.3, and Y+Z=0.025 to 0.3) (see Japanese Patent Laid-Open No. 11-335164).

Additionally, the fuel electrode 3 is known to be formed of a porous sintered body composed of particles of a B-doped ceria (wherein B is one or more of Sm, La, Gd, Y and Ca) represented by a general formula, $Ce_{1-m}B_mO_2$ (wherein B is one or more of Sm, La, Gd, Y and Ca, and m satisfies the relation $0<m\leq0.4$) and nickel particles, and the porous sintered body is also known to have a structure in which the nickel particles are mutually sintered to form a framework structure, and the particles of the B-doped ceria having a particle size of 0.1 to 2 μm form a network structure and attach to the surface of the porous nickel having such a framework structure. Further, the air electrode 2 is formed of a ceramic such as $(Sm,Sr)CoO_3$ or $(La,Sr)MnO_3$ (see Japanese Patent Laid-Open No. 11-297333).

On the other hand, the fuel electrode current collector 6 is generally formed of Ni mesh. Additionally, the air electrode current collector 5 is known to be generally formed of platinum mesh; however, in the past years, the following materials come to be used instead of expensive platinum mesh: inexpensive silver porous materials such as silver mesh, silver felt and silver foam, and silver-coated porous metal materials formed by coating the surface of meshes, felts or metal foams made of metals other than silver with silver (see Japanese Patent Laid-Open No. 2002-280026).

Further, the air electrode current collector-side separator 7 and the fuel electrode current collector-side separator 8 of the solid electrolyte fuel cell are usually formed of a stainless steel, such as SUS 430, excellent in high temperature corrosion resistance; the surface of the air electrode current collector-side separator 7 is especially susceptible to oxidation, hence the surface of the air electrode current collector-side separator 7 is oxidized to increase the contact resistance with the air electrode current collector 5 to significantly waste the electromotive force, and consequently the electricity generation efficiency is significantly decreased; thus, as shown in FIG. 2, a silver plating layer 9 generally comes to be formed on the surface of the air electrode current collector-side separator 7 (see Japanese Patent Laid-Open No. 2002-289215).

A solid electrolyte fuel cell having such a configuration as described above usually operates within a temperature range from 650 to 1000° C.

However, the following problems may arise in the case where a solid electrolyte fuel cell uses an air electrode current collector formed of porous silver materials such as silver mesh, silver felt and silver foam, or an air electrode current collector formed of silver-coated porous metal materials formed by coating the surface of meshes, felts or metal foams made of metals other than silver with silver, and a silver plating layer is formed on the surface of the air electrode current collector-side separator. That is, when such a solid electrolyte fuel cell is operated for a long period of time within a temperature range from 650 to 1000° C., silver is evaporated within this temperature range although the evaporation amount is extremely small. Thus, when such a solid electrolyte fuel cell is used for a long period of time, the silver on the air electrode current collector and the sliver plating layer formed on the surface of the air electrode current collector-side separator are gradually diminished, consequently, the performance of the air electrode current collector is degraded and the contact resistance between the air electrode current collector-side separator 7 and the air electrode current collector 5 is increased due to the diminishing of the sliver plating layer formed on the surface of the air electrode current collector-side separator, and thus the electromotive force is significantly wasted to decrease the electricity generation efficiency.

SUMMARY OF THE INVENTION

Accordingly, from the above-described viewpoints, the present inventors have been involved in research to develop a solid electrolyte fuel cell capable of being used for a longer period of time. Consequently, the following research results were obtained in using a solid electrolyte fuel cell which has an air electrode current collector formed of one of porous silver materials, such as silver mesh, silver felt and silver foam, and silver-coated porous metal materials formed by coating the surface of meshes, felts or metal foams made of metals other than silver with silver, and an air electrode current collector-side separator in which a silver plating layer is formed on the surface of the side in contact with the air electrode current collector.

When silver vapor-containing air is supplied from an air supply passage of the solid electrolyte fuel cell during the operation of the solid electrolyte fuel cell, the silver on the air electrode current collector and the silver plating layer formed on the surface of the air electrode current collector-side separator can be prevented from diminishing to thereby extend the operating life of the solid electrolyte fuel cell.

The present invention has been achieved on the basis of such research results as described above, and is characterized in a first aspect of the invention which includes an operating method of a solid electrolyte fuel cell including an air electrode current collector formed of a porous silver material or a silver-coated porous metal material laminated so as to be in contact with an air electrode of a power generating cell, and an air electrode current collector-side separator in which a silver plating layer is formed on the surface of the side in contact with the air electrode current collector, wherein silver vapor-containing air is supplied to the air electrode current collector formed of a porous silver material or a silver-coated porous metal material; and a second aspect of the invention, which includes the operating method of a solid electrolyte fuel cell according to the above-described first aspect, wherein the solid electrolyte fuel cell includes: the power generating cell in which a fuel electrode is laminated on one side of a solid electrolyte and the air electrode is laminated on the other side of the solid electrolyte; the air electrode current collector formed of a porous silver material or a silver-coated porous metal material laminated so as to be in contact with the air electrode of the power generating cell; a fuel electrode current collector laminated so as to be in contact with the fuel electrode of the power generating cell; the air electrode current collector-side separator in which a silver plating layer is formed on the surface of the side in contact with the air electrode current collector; a fuel electrode current collector-side separator laminated so as to be in contact with the fuel electrode current collector; an air supply passage connected to the air electrode current collector-side separator; and a fuel supply passage connected to the fuel electrode current collector-side separator.

The silver vapor-containing air supplied from the air supply passage can be produced by allowing air to pass through a silver member heated to a temperature higher than room temperature while the air is being in contact with the heated silver member. Accordingly, the present invention is characterized in a third aspect of the invention, which includes the operating method of a solid electrolyte fuel cell according to the above-described first aspect, wherein the silver vapor-containing air is produced by allowing air to pass through a heated silver member while the air is being in contact with the heated silver member.

When the silver member is a silver member made of a material with a large specific surface area so as to be large in contact area with air such as a porous silver material having continuous holes, a silver particle aggregate, a silver fine wire aggregate or a silver gauze laminate, the silver member can produce the silver vapor-containing air with a further higher efficiency. Accordingly, the present invention is characterized in a fourth aspect of the invention which includes the operating method of a solid electrolyte fuel cell according to the above-described third aspect, wherein the silver member is a silver member having a large contact area with air.

The structure of the solid electrolyte fuel cell according to the present invention is described more specifically on the basis of the sectional view of FIG. 1.

In FIG. 1, reference numeral 1 denotes a solid electrolyte, 2 denotes an air electrode, 3 denotes a fuel electrode, 4 denotes a power generating cell, 5 denotes an air electrode current collector formed of a porous silver material or a silver-coated porous metal material, 6 denotes a fuel electrode current collector, 7 denotes an air electrode current collector-side separator, 8 denotes a fuel electrode current collector-side separator, 9 denotes a silver plating layer, 10 denotes a fuel supply passage made of a pipe or the like, and 11 denotes an air supply passage made of a pipe or the like; reference numerals in FIG. 2 have the same meanings as described above, and accordingly description thereon is omitted.

The solid electrolyte fuel cell according to the present invention is characterized in that: the sliver vapor-containing air is supplied to the air electrode current collector formed of a porous silver material or a silver-coated porous metal material through the air supply passage formed of a pipe or the like; the consumption of the silver of the air electrode current collector formed of a porous silver material or a silver-coated porous metal material and the consumption of the silver plating layer formed on the air electrode current collector-side separator are reduced as much as possible; and thus the operating life of the solid electrolyte fuel cell is extended. For the purpose of supplying the silver vapor-containing air, a silver vapor supply unit is provided in the air supply passage, and the silver vapor-containing air produced by allowing air to pass through the silver vapor supply unit is supplied to the air electrode current collector 5.

As shown in FIG. 1, the silver vapor supply unit may be a unit including a silver inner layer 13 such as a sprayed silver layer formed on the inner surface of the air supply passage 11 formed of a pipe or the like, or may be a unit including in a built-in manner in a case 12 a silver member 14 with a large specific surface area, formed of a porous silver material having continuous holes, a silver particle aggregate, a silver fine wire aggregate such as silver felt, or a silver gauze laminate. Alternatively, the silver vapor supply unit may be a unit including a silver inner layer 13 such as a sprayed silver layer formed on the inner surface of the air supply passage and further including in a built-in manner in a case 12 a silver member with a large specific surface area, formed of a porous silver material having continuous holes, a silver particle aggregate, a silver fine wire aggregate such as silver felt, or a silver gauze laminate. In any of the above-described units, by allowing air to pass through the silver vapor supply unit, the air is brought into contact with silver and thus the silver vapor-containing air can be produced.

Accordingly, the present invention is characterized in a fifth aspect of the invention, which includes a solid electrolyte fuel cell including: a power generating cell in which a fuel electrode is laminated on one side of a solid electrolyte and the air electrode is laminated on the other side of the solid electrolyte; an air electrode current collector formed of a porous silver material or a silver-coated porous metal material laminated so as to be in contact with the air electrode of the power generating cell; a fuel electrode current collector laminated so as to be in contact with the fuel electrode of the power generating cell; an air electrode-side separator in which a silver plating layer is formed on the surface of the side in contact with the air electrode current collector; a fuel electrode-side separator laminated so as to be in contact with the fuel electrode current collector; an air supply passage connected to the air electrode-side separator; and a fuel supply passage connected to the fuel electrode-side separator, wherein a silver vapor supply unit is provided in the air supply passage;

a sixth aspect of the invention, which includes the solid electrolyte fuel cell according to the above-described fifth aspect, wherein the silver vapor supply unit includes a silver inner layer formed on the inner surface of the air supply passage;

a seventh aspect of the invention, which includes the solid electrolyte fuel cell according to the above-described fifth aspect, wherein the silver vapor supply unit includes a silver member with a large specific surface area, disposed in the air supply passage; and an eighth aspect of the invention, which includes the solid electrolyte fuel cell according to the above-described seventh aspect, wherein the silver member with a large specific surface area is formed of a porous silver material having continuous holes, a silver particle aggregate, a silver fine wire aggregate or a silver gauze laminate.

The solid electrolyte fuel cell and its operating method according to the present invention, do not result in the decrease of the output power even when the solid electrolyte fuel cell is used over a long period of time.

BRIEF DESCRIPTION OF THE DRAWINGS

FIG. 2 is a view illustrating a conventional solid electrolyte fuel cell.

DETAILED DESCRIPTION OF THE INVENTION

Figure 1:
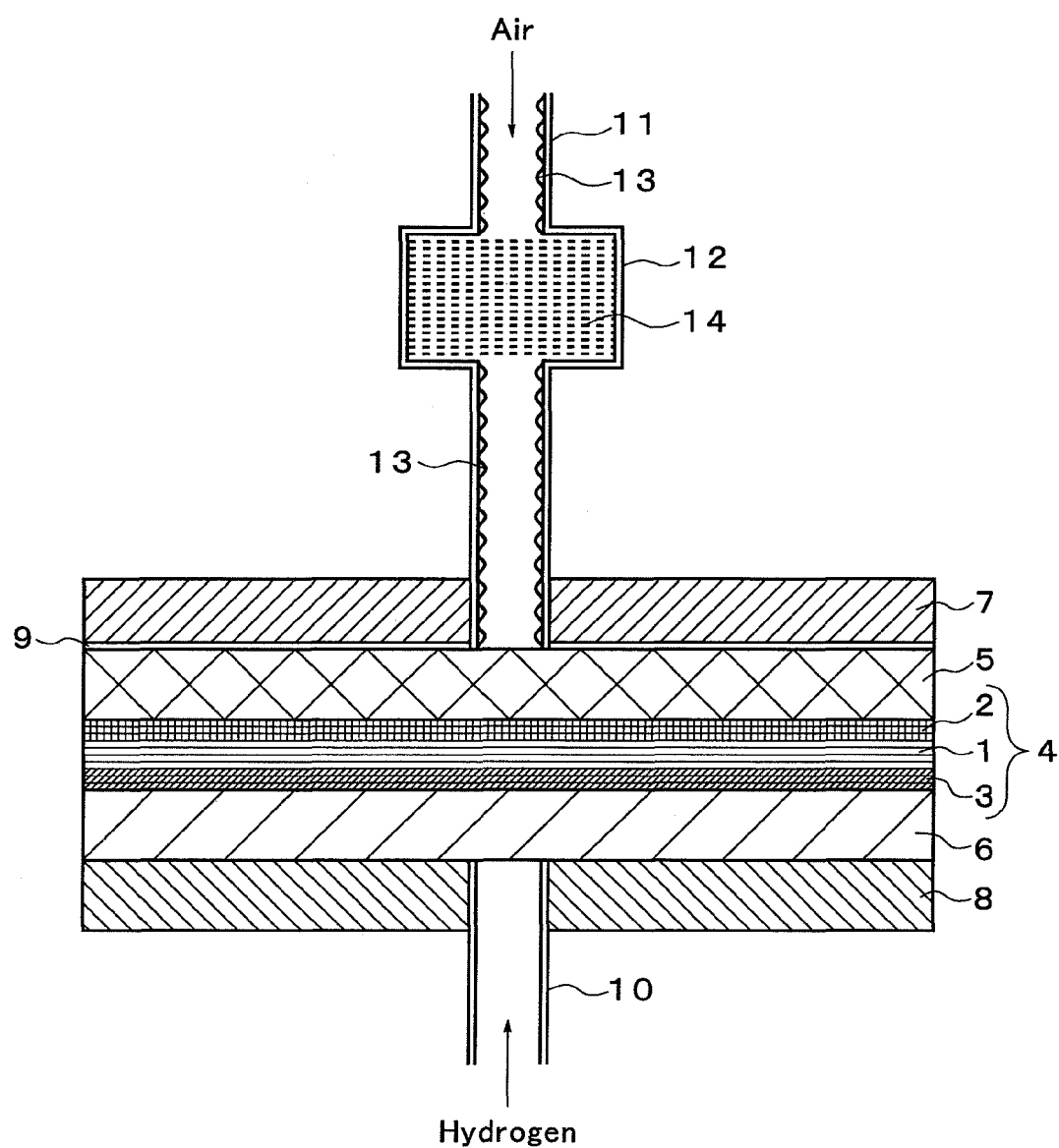
FIG. 1 is a view illustrating a solid electrolyte fuel cell according to the present invention.

Powders of lanthanum oxide, strontium carbonate, gallium oxide, magnesium oxide and cobalt oxide were prepared and weighed out so as to give the composition represented by $(La_{0.8}Sr_{0.2})(Ga_{0.8}Mg_{0.15}Co_{0.05})O_3$; the weighed out powders were mixed with a ball mill, and thereafter heated and maintained at 1300° C. in air for 3 hours to yield an agglomerate sintered body; the obtained agglomerate sintered body was pulverized with a hammer mill and then milled with a ball mill to produce a raw material powder for a lanthanum gallate electrolyte having an average particle size of 1.3 μm.

To a mixed aqueous solution composed of 8 parts of a 0.5 mol/L aqueous solution of cerium nitrate and 2 parts of a 0.5 mol/L aqueous solution of samarium nitrate, a 1 mol/L aqueous solution of sodium hydroxide was added by drops under stirring, and thus cerium oxide and samarium oxide were coprecipitated. Then, the produced powder was sedimented by using a centrifugal separator, the supernatant liquid was removed, the powder was added with distilled water to be washed under stirring, and the powder was re-sedimented by using the centrifugal separator; such an operation cycle was repeated six times to wash the powder. Then, the powder was sedimented by using the centrifugal separator, added with water and stirred, and re-sedimented by using the centrifugal separator; such an operation cycle was repeated three times, then the solvent was replaced from water to ethanol to prepare an ethanol solution containing an ultrafine powder of a samarium-doped ceria (hereinafter referred to as SDC). A fraction of the thus obtained ethanol solution containing an ultrafine powder of SDC was taken out, and the particle size of the ultrafine powder of ceria was measured by means of laser diffractometry, and the average particle size was found to be 5 nm.

To a 1 mol/L aqueous solution of nickel nitrate, a 1 mol/L aqueous solution of sodium hydroxide was added by drops under stirring to precipitate nickel hydroxide and the nickel hydroxide was filtered off, and then washed with water by repeating six times a cycle of washing with purified water under stirring and filtering. The nickel hydroxide thus obtained was heated and maintained at 900° C. in air for 3 hours to produce a nickel oxide powder having an average particle size of 1.1 μm.

Powders of samarium oxide, strontium carbonate and cobalt oxide were prepared, weighed out so as to give a composition represented by $(Sm_{0.5}Sr_{0.5})CoO_3$, mixed with a ball mill, and then heated and maintained at 1200° C. in air for 3 hours; the obtained powder was milled with a ball mill to produce a raw material powder for a samarium strontium cobaltite air electrode having an average particle size of 1.1 μm.

Next, by using the produced raw material powders, a power generating cell was produced in the following manner.

First, the produced raw material powder for the lanthanum gallate electrolyte was mixed with an organic binder solution prepared by dissolving polyvinyl butyral and N-dioctyl phthalate in a toluene-ethanol mixed solvent to produce a slurry; the slurry was formed into a thin plate by doctor blade method, the thin plate was cut out to a circular plate, the circular plate was heated and maintained at 1450° C. in air for 4 hours to be sintered, and thus a disc-shaped lanthanum gallate electrolyte of 200 μm in thickness and 120 mm in diameter was produced.

The nickel oxide powder and the ethanol solution containing the ultrafine powder of SDC were mixed so that volume ratio between nickel oxide and SDC became 60:40; further, the mixture thus obtained was mixed with an organic binder solution prepared by dissolving polyvinyl butyral and N-dioctyl phthalate in a toluene-ethanol mixed solvent, a surfactant and a dispersant composed of sodium sulfonate to produce a slurry. The slurry was applied by screen printing to the disc-shaped lanthanum gallate electrolyte to form a 30-1 μm thick slurry film; the slurry film was dried, and then heated and maintained at 1250° C. in air for 3 hours; thus, the fuel electrode was formed by baking on the disc-shaped lanthanum gallate electrolyte.

It is to be noted that the wet-processed (coprecipitated) powder is a dispersed ultrafine powder (nanoparticles), but when dried, immediately coagulated; accordingly, the ultrafine SDC powder-containing ethanol solution was used for the purpose of producing a slurry by mixing the powder with nickel oxide under the conditions that the powder was kept in a state of a fine powder and the coagulation of the powder was avoided. At the time of drying after forming, the SDC was coagulated on the surface of the nickel oxide powder, and thus, an independently distributed state of ceria was formed. In this way, the fuel electrode was formed.

The raw material powder for a samarium strontium cobaltite air electrode was mixed with an organic binder solution prepared by dissolving polyvinyl butyral and N-dioctyl phthalate in a toluene-ethanol mixed solvent to produce a slurry. The slurry was applied by screen printing to the other side of the lanthanum gallate electrolyte than the baked fuel electrode carrying side to form a 30-μm thick slurry film; the slurry film was dried, and then heated and maintained at 1100° C. in air for 5 hours; thus the air electrode was formed by baking.

In the above-described manner, a power generating cell including a solid electrolyte, a fuel electrode and an air electrode was produced; a 1-mm thick fuel electrode current collector formed of porous Ni was laminated on the fuel electrode of the obtained power generating cell, and on the other hand, a 1.2-mm thick air electrode current collector formed of porous Ag was laminated on the air electrode of the power generating cell; further, a fuel electrode current collector-side separator formed of SUS304 stainless steel was laminated on the fuel electrode current collector and an air electrode current collector-side separator formed of silver-plated SUS304 stainless steel was laminated on the air electrode current collector. Further, a fuel supply passage formed of a pipe was connected to the fuel electrode current collector-side separator, and an air supply passage formed of a pipe was connected to the air electrode current collector-side separator.

A silver inner layer was formed on the inner surface of the air supply passage connected to the air electrode current collector-side separator, and a silver felt formed by lightly compressing silver fiber was housed in a case disposed in the air supply passage. Consequently, a silver vapor supply unit was provided in the air supply passage, and the solid electrolyte fuel cell according to the present invention having a configuration shown in FIG. 1 was prepared.

Conventional Example

For comparison, prepared was a conventional solid electrolyte fuel cell having a configuration shown in FIG. 2 without any silver vapor supply unit provided therein.

By using the solid electrolyte fuel cell of the present invention and the conventional solid electrolyte fuel cell obtained as described above, a power generation test was performed under the following conditions; each of these fuel cells was made to generate electricity, and the electricity generation time elapsed until the output voltage was decreased from 0.8 V to 0.6 V was measured. The results thus obtained are shown in Table 1.

Temperature: 750° C.
Fuel gas: Hydrogen
Fuel gas flow rate: 0.34 L/min (=3 cc/min/cm$^2$)
Oxidant gas: Air
Oxidant gas flow rate: 1.7 L/min (=15 cc/min/cm$^2$)

TABLE 1

| Type | Electricity generation time (hours) elapsed until the output voltage is decreased from 0.8 V to 0.6 V |
| --- | --- |
| Solid electrolyte fuel cell of the present invention | 40000 |
| Conventional solid electrolyte fuel cell | 20000 |

As can be seen from the results shown in Table 1, the solid electrolyte fuel cell of the present invention is markedly longer in the electricity generation time elapsed until the output voltage is decreased from 0.8 V to 0.6 V as compared to the conventional solid electrolyte fuel cell, and hence can be operated over a long period of time without degrading the performance thereof and has a long operating life.

As described above, according to the present invention, a solid electrolyte fuel cell having a long service life can be provided.

The invention claimed is:

1. An operating method of a solid electrolyte fuel cell, the solid electrolyte fuel cell comprising an air electrode current collector formed of a porous silver material or a silver-coated porous metal material laminated so as to be in contact with an air electrode of a power generating cell, and an air electrode current collector-side separator in which a silver plating layer is formed on the surface of a side of the air electrode current collector-side separator in contact with the air electrode current collector, said method comprising:
   producing silver vapor-containing air by enabling air to pass through a heated silver member while the air is in contact with the heated silver member, and
   supplying the silver vapor-containing air to the air electrode current collector formed of a porous silver material or a silver-coated porous metal material,
wherein the fuel cell comprises an air supply passage connected to the air electrode current collector-side separator, and
wherein the silver member comprises a housing having a larger cross-sectional area than a cross-sectional area of the air supply passage, the air supply passage housing including a porous silver material having continuous holes, a silver particle aggregate, a silver fine wire aggregate or a silver gauze laminate.

2. The operating method of a solid electrolyte fuel cell according to claim 1, wherein the solid electrolyte fuel cell further comprises:
   a power generating cell having a fuel electrode, an air electrode, and a solid electrolyte having a first side and a second side, the fuel electrode being laminated on the first side of the solid electrolyte and the air electrode being laminated on the second side of the solid electrolyte;
   a fuel electrode current collector laminated so as to be in contact with the fuel electrode of the power generating cell;
   a fuel electrode current collector-side separator laminated so as to be in contact with the fuel electrode current collector; and
   a fuel supply passage connected to the fuel electrode current collector-side separator.

3. The operating method according to claim 1, wherein the silver member further comprises a silver inner layer formed on an inner surface of the air supply passage.

4. The operating method of a solid electrolyte fuel cell according to claim 3, wherein the silver member is a silver member having a large contact area with air.

5. A solid electrolyte fuel cell comprising:
   a power generating cell having a fuel electrode, an air electrode, and a solid electrolyte having a first side and a second side, said fuel electrode being laminated on said first side of said solid electrolyte and said air electrode being laminated on said second side of said solid electrolyte;
   an air electrode current collector formed of a porous silver material or a silver-coated porous metal material laminated so as to be in contact with said air electrode of said power generating cell;
   a fuel electrode current collector laminated so as to be in contact with said fuel electrode of said power generating cell;
   an air electrode-side separator having a surface of a side in contact with said air electrode current collector, said surface having a silver plating layer formed thereon;
   a fuel electrode-side separator laminated so as to be in contact with said fuel electrode current collector;
   an air supply passage connected to said air electrode-side separator; and
   a fuel supply passage connected to said fuel electrode-side separator,
   wherein a silver vapor supply unit comprising a silver member with a large specific surface area is disposed in said air supply passage, and
   wherein said silver vapor supply unit comprises a housing having a cross-sectional area larger than a cross-sectional area of said air supply passage, and said housing including a porous silver material having continuous holes, a silver particle aggregate, a silver fine wire aggregate or a silver gauze laminate.

6. The solid electrolyte fuel cell according to claim 5, wherein the silver vapor supply unit further comprises a silver inner layer formed on an inner surface of the air supply passage.

* * * * *